June 1, 1965          E. D. MOREY          3,187,137

ADJUSTABLE PRESSURE RESPONSIVE CONTROL MEANS

Filed May 25, 1962          3 Sheets-Sheet 1

INVENTOR.
EVERETT D. MOREY
BY Walter E. Rule
HIS ATTORNEY

June 1, 1965  E. D. MOREY  3,187,137
ADJUSTABLE PRESSURE RESPONSIVE CONTROL MEANS
Filed May 25, 1962  3 Sheets-Sheet 2
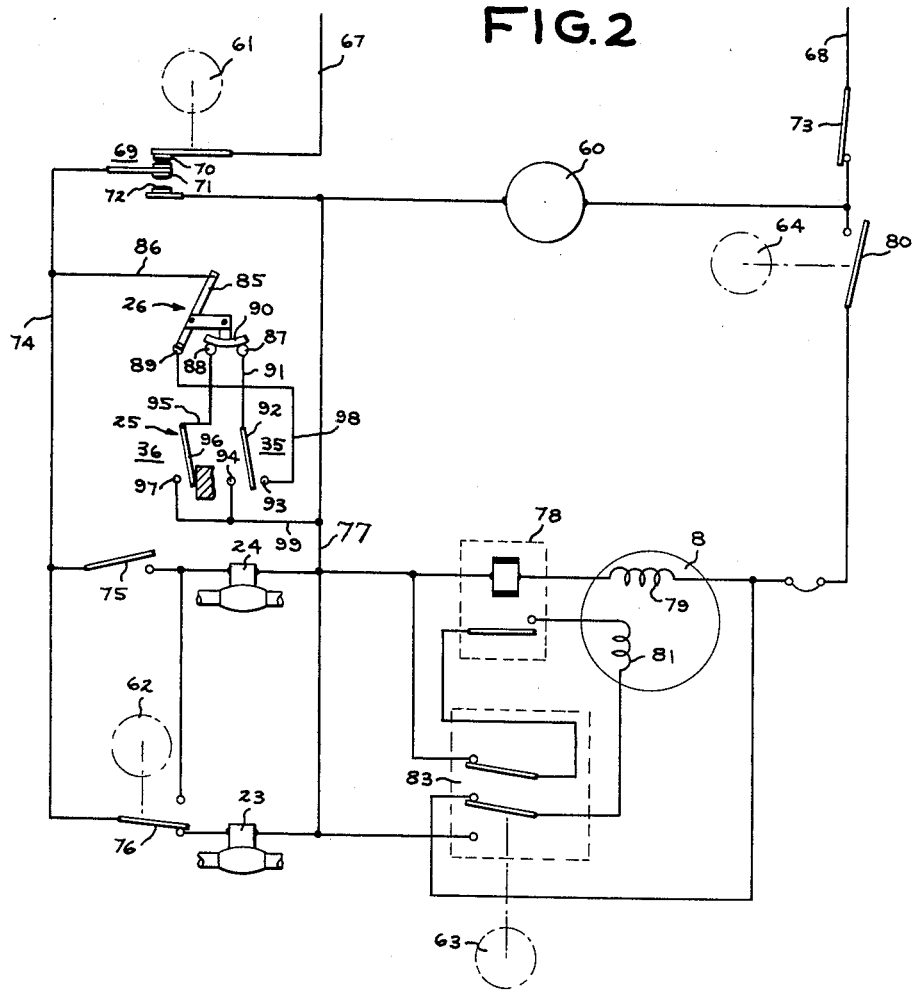
INVENTOR.
EVERETT D. MOREY
BY Walter E. Rule
HIS ATTORNEY June 1, 1965 E. D. MOREY 3,187,137
ADJUSTABLE PRESSURE RESPONSIVE CONTROL MEANS
Filed May 25, 1962
3 Sheets-Sheet 3
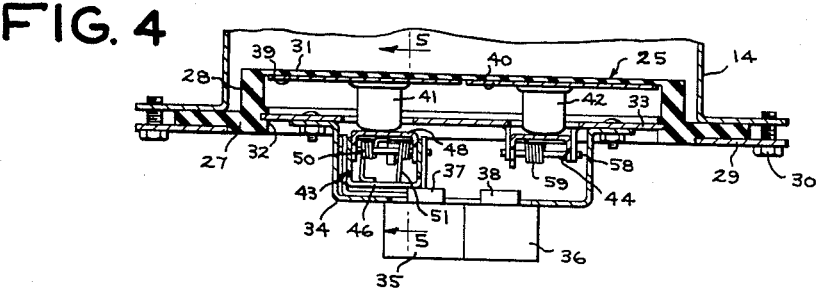
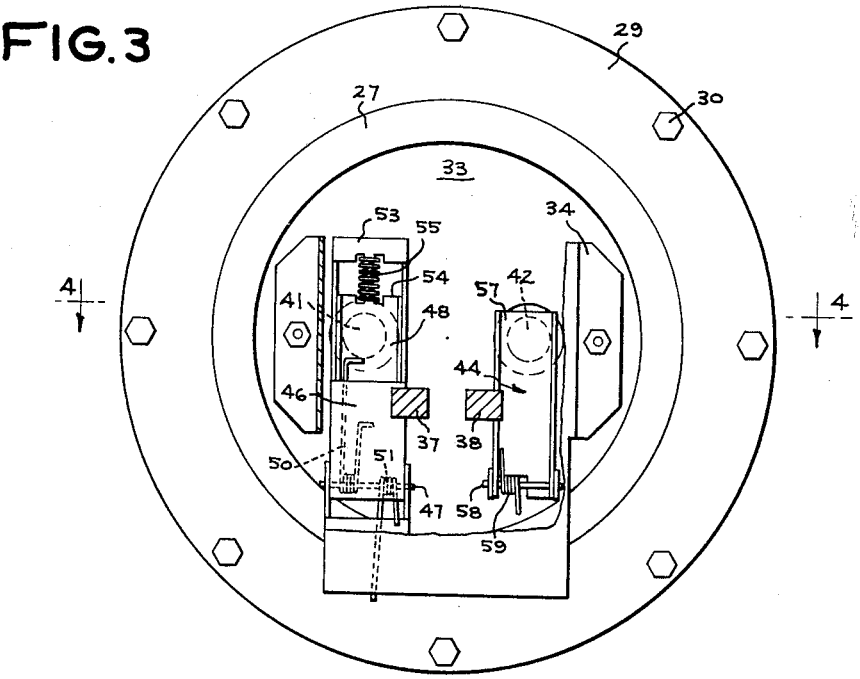
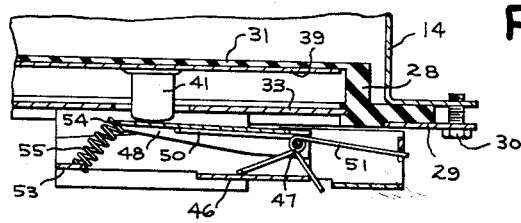
INVENTOR.
EVERETT D. MOREY
BY *Walter E. Gule*
HIS ATTORNEY

United States Patent Office 3,187,137
Patented June 1, 1965

3,187,137
ADJUSTABLE PRESSURE RESPONSIVE
CONTROL MEANS
Everett D. Morey, Louisville, Ky., assignor to General
Electric Company, a corporation of New York
Filed May 25, 1962, Ser. No. 197,669
3 Claims. (Cl. 200—83)

The present invention relates to adjustable pressure responsive control means and is more particularly concerned with a pressure responsive control means which can be adjusted for operation at any one of a plurality of pressures from a remote location.

In the operation of washing machines and the like, it is desirable to provide adjustable means designed to stop the flow of water into the machine at any of a plurality of levels. The control of the water level in a washing machine can be accomplished by control means including switch means responsive to the pressure of the head of water in the machine and arranged, for example, to interrupt the flow of water at low, medium or high water levels.

It is a general object of the present invention to provide pressure responsive control means including accessible selector means for selecting the desired water level and pressure responsive switch means pressure actuated to provide the selected water level.

Another object of the present invention is to provide pressure responsive means including a plurality of switches adapted to be operated in the proper sequence to provide the desired control.

In carrying out the objects of the present invention, in one aspect thereof, there is provided a pressure responsive control means including a flexible member positioned to be moved in response to variations in a fluid pressure and switch means actuated by the movable member and adapted to be interconnected with a selector switch to obtain high, medium or low pressure operation of the control means. In the preferred embodiment of the invention, there is provided two pressure actuated switches and means for controlling the operation of one or both of the switches in response to movement of different portions of the pressure responsive movable member so as to obtain a control function at any one of three pressure conditions. More specifically, the two pressure actuated switches are individually actuated by the movable member in such a manner that in cooperation with a selector switch, one of the switches provides means for obtaining operation of the control means at a first pressure condition and the other switch provides means for obtaining operation of the control means at either of two other pressure conditions.

The features of the invention which are believed to be novel are set forth with particularity in the claims appended hereto. The invention itself, however, both as to organization and the method of operation, together with further objects and advantages thereof, may best be understood by reference to the following detailed description taken in connection with the accompanying drawing.

In the drawing,

FIGURE 2 is a schematic diagram of an electrical control circuit incorporating the present invention, which circuit is designed for operation of the machine of FIGURE 1;

Figure 1:
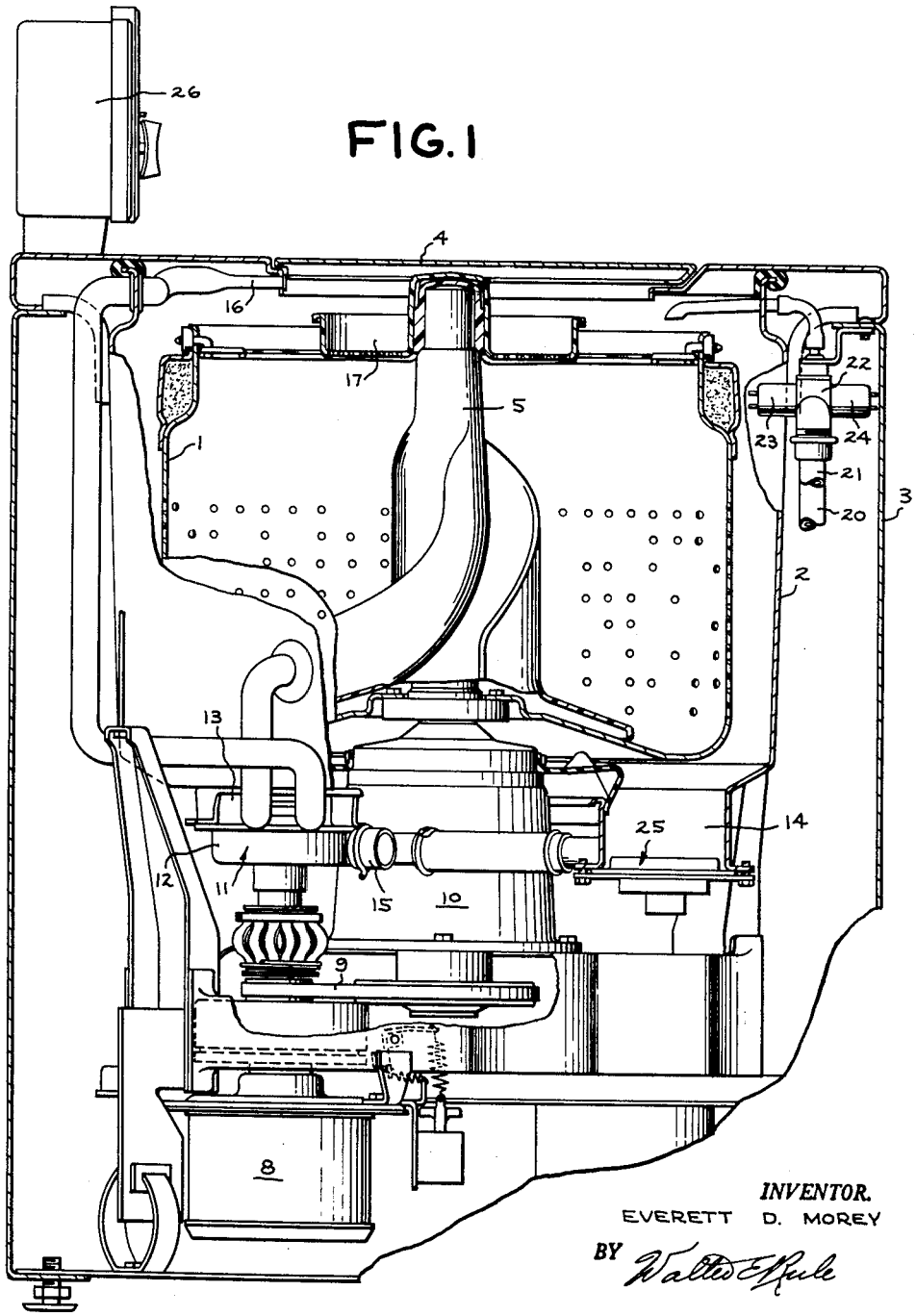
FIGURE 1 is a front elevational view of a clothes washing machine including the pressure responsive means of the present invention, the view being partially broken away and partially in section to show details.

FIGURE 3 a bottom view of the pressure responsive means of the present invention, partially broken away to show details;

FIGURE 4 is a view taken along line 4—4 of FIGURE 3; and

FIGURE 5 is a view of a portion of the pressure responsive switch means taken along line 5—5 of FIGURE 4.

Referring now to FIGURE 1, I have shown therein an agitator-type washing machine having a conventional perforated basket or clothes receiving receptacle 1 disposed within an outer imperforate tub or casing 2 which serves as a liquid receptacle. With this combination, the receptacle 1 and tub 2 thus form together receptacle means for containing liquid and the fabrics or clothes to be immersed in the liquid.

Tub 2 is rigidly mounted within an appearance cabinet 3 which includes a cover 4 hingedly mounted in the top portion of the cabinet for providing access to the basket 1. At the center of basket 1 there is positioned an agitator 5 for flexing clothes which are placed in the basket.

The clothes basket 1 and the agitator 5 are rotatably mounted. The basket is mounted on a rotatable hub 6, and the agitator 5 is mounted on a shaft (not shown) which extends upwardly through the hub 6 and through the agitator and is secured to the agitator so as to drive it. During the cycle of operaiton of the machine, wash water is introduced into the tub 2 and basket 1, and the agitator is then oscillated back and forth on its axis. Then, after a predetermined period of this action, the basket is rotated at high speed to extract centrifugally the liquid from the clothes and discharge it to drain. Following this extraction operation, a supply of clean liquid is introduced into the basket for rinsing the clothes and once again the agitator is oscillated. Finally, the basket is once more rotated at high speed to extract the rinse water. Of course, more than one rinsing operation may be provided if so desired, and other irrelevant modifications such as, for instance, spray rinses during the spinning operation, may also be provided.

Basket 1 and agitator 5 may be driven through any suitable means from a reversing motor 8. By way of example, I have shown them as driven from motor 8 through a system including a belt 9 and a transmission assembly 10, which is so arranged that it supports and drives both the agitator drive shaft and basket mounting hub 6. When motor 8 is rotated in one direction, the transmission causes agitator 5 to oscillate within the basket 1. Conversely, when motor 8 is driven in the opposite direction, the transmission rotates the wash basket 1 and agitator together at high speed for centrifugal extraction of liquid from the load.

In addition to operating the transmission as described, motor 8 also provides a direct drive to a pump structure 11, which may include two separate pumping units 12 and 13 both operated in the same direction simultaneously by motor 8. Pump 12 has an inlet which is connected to a drain or sump 14 formed at the lowermost point of tub. Pump 12 also has an outlet which is connected by a conduit 15 to a discharge (not shown) exterior of the machine. The pump 13 has an inlet connected to the interior of tub 2 and an outlet connected to a nozzle 16. The pumps are formed so that in the spin direction of motor rotation, the pump 12 will drain in liquid from sump or drain 14 and then discharge it from the machine, and in the other direction of rotation, pump 13 will draw in liquid from the tub and discharge it through nozzle 16 into a lint filter 17 from which the liquid returns to basket 1.

Hot and cold water are supplied to the machine through conduits 20 and 21 which are adapted to be connected respectively to sources of hot and cold water (not shown). These conduits extend into a conventional mixing valve structure 22 having solenoids 23 and 24. Energization of solenoid 23 permits passage of hot water through the valve to basket 1, energization of solenoid 24 permits passage of cold water to the basket, and energization of both solenoids permits mixing of hot and cold water in the valve and passage of warm water into the basket.

In accordance with the present invention, the level to which water rises in the basket and tub is controlled by liquid level control means including a pressure responsive switch means 25 positioned in the bottom wall of the drain opening 14 and a selector switch 26 (shown in FIGURE 2) positioned along with other controls in the backsplasher.

The pressure responsive control means for selecting and controlling the level to which the water rises in the basket and tub during the filling operation or operations is of the type designed to be incorporated in the other electrical control circuitry employed in operating the machine in such a manner that when a predetermined water level is reached, the solenoid valve or valves controlling the flow of water to the machine are shorted and the valves closed. In other words, the pressure responsive control means is connected generally parallel with the solenoid valves.

The selector switch 26 employed to select the level at which the water flow is stopped will be described in connection with the operation of the electrical control system. The detail construction of the pressure responsive switch means 25 is shown in FIGURES 3, 4 and 5 of the drawing. It comprises a housing 27 composed of a material such as rubber or the like and including a peripheral or side wall anchoring portion 28 secured by means of a clamping ring 29 and bolts 30 to the bottom portion of the drain 14 and a relatively thin and flexible top portion 31 forming a fluid pressure responsive movable member or diaphragm. The movable portion 31 is subjected to the head of water within the washing machine. Supported by the side wall 28, as for example, by the groove 32 provided on the interior surface of the side wall, is a plate 33 to which is secured a support 34. Mounted on the support 34 are toggle switches 35 and 36. Switch 35 is a single pole double throw toggle switch and switch 36 is a single pole switch, both being of the well known types with the switch buttons 37 and 38 normally biased in an upward direction.

The switches 35 and 36 are actuated by movement of the diaphragm 31 to pressure changes thereon. To this end, the diaphragm is provided with two downwardly projecting knobs 41 and 42 respectively supporting reinforcing members 39 and 40. As indicated in FIGURE 4, these reinforcing members 39 and 40 are separated to permit independent operation or movement of the knobs 41 and 42. Disposed between the knobs 41 and 42 and the switch buttons 37, 38 and respectively operated by these knobs are switch actuators 43 and 44.

The actuator 43 has a switch operating or contacting arm 46 pivotally supported at one end on a pin 47 and a second arm 48 abutting the knob 41. A first coil spring 50 carried by the pin 47 biases the free ends of the arms 46 and 48 away from each other while a second coil spring 51 carried by the pivot pin 47 biases the arm 48 upwardly to a normal or no pressure position and resists downward movement of the diaphragm below this pressure condition. As is shown more clearly in FIGURES 3 and 5 of the drawing, the arm 48 is somewhat shorter than the arm 46 and the arm 46 includes a transverse end portion 53 spaced a sufficient distance from the end 54 of the arm 48 to receive an overcenter or toggle spring 55 extending between the ends of the arms and designed to provide a snap action between the arms 46 and 48 when the arm 48 is moved overcenter with reference to the arm 46.

The actuator 44 provided for operating switch 36 comprises an arm 57 pivotally supported on a pin 58 and biased upwardly in opposition to the movement of the knob 42 by means of a coil spring 59.

Referring now to FIGURE 2, the electrical control system for the machine of FIGURE 1 and the operation of the pressure responsive control means of the present invention will be more fully described.

In order to control the sequence of operations of the components of the machine, the circuit includes an automatic sequence control assembly which incorporates a timer motor 60 driving a plurality of cams 61, 62, 63 and 64. These cams, during their rotation by the timer motor, actuate various switches, causing the machine to pass through an appropriate cycle of operations which include washing the clothes, extracting the wash water, rinsing the clothes in clean water, and finally centrifuging the rinse water from the clothes.

The electric circuit as a whole is energized from power supply lines or conductors 67 and 68. Cam 61 controls a switch 69 which includes contacts 70, 71, and 72 and when the cam has assumed a position where all three contacts are separated, the machine is disconnected from the power source and is inoperative. When operation of machine is to be initiated, switch 69 is controlled by cam 61 so that contacts 70 and 71 are engaged and the main switch 73 is closed. A circuit is then completed from line 67 through a conductor 74 and a manually operated switch 75 to the valve control solenoid 24. In addition, a circuit is completed from conductor 74 through a switch 76 controlled by cam 62. In the "up" position, switch 76 completes a circuit for solenoid 24 independently of switch 75, and in the "down" position shown, the switch 76 completes a circuit for solenoid 23. Thus, when switch 75 is open, energization of solenoids 23 and 24 is under the control of switch 76, but when switch 75 is closed the cold water solenoid 24 may be energized independently of the position of switch 76. From the hot and cold water solenoids, the energizing circuit then extends through a conductor 77, a starting relay 78, the main winding of motor 8, a switch 80 controlled by cam 64, switch 73, and the conductor 68.

Motor 8 is of the conventional type which includes a start winding 81 which assists the main winding during starting of the motor and is energized in parallel therewith. When a relatively high current passes through the relay 78 an energizing circuit for the start winding is completed in parallel with the main winding. This circuit also includes a motor reversing switch generally indicated at 83 and which is controlled by cam 63. A circuit is also completed in parallel with motor 8 through the timer motor 60.

When the main winding 79 of motor 8 is in series with the valve solenoids 23 and 24, as described, a much lower impedance is presented in the circuit by the motor than is presented by the valve solenoids. As a result, the greater portion of the supply voltage is taken up across the solenoids and relatively little across the motor. This causes whichever of the solenoids is connected in the circuit to be energized sufficiently to open its associated water valve. As a result, water at a selected temperature is admitted to the machine and motors 8 and 60 remaining inactive.

This action continues, with the circuitry thus arranged, so that the water pours into the basket 1 and tub 2 and because the basket is perforated, the water rises in both basket and tub at the same rate. The introduction of water continues until the water level sensing means including selector switches 25 and pressure switch 26 complete a short circuit across the solenoids directly from conductor 74 to conductor 77 so that, with the solenoids thus excluded from the effective circuit, they become de-energized and a high potential drop is provided across winding 79 of the motor 8. This causes the relay 78 to close the start winding circuit to start the motor, while, at the same time, timing motor 60 starts so as to initiate and control a sequence of operations.

The switch 80 is in series with the main motor but is not, however, in series with timer motor 60. Thus, by the opening of switch 80, the energization of motor 8 may be stopped.

The operation of the presure responsive control means to short the solenoids at any one of a plurality of water levels in the machine involves a manual setting of the selector switch 26 at the desired water level followed by the operation of one or both of the switches 35 and 36 to complete a shorting circuit. The selector switch 26 may be a rotary switch including a switch arm 85 connected to the conductor 74 through conductor 86, the arm 85 being movable to engage any one of the three contacts 87, 88 and 89. When the arm 85 engages the contact 87, the selector switch is set for low water level while engagement of the switch arm 85 with contact 88 provides an intermediate water level and with the contact 89 a high water level. Switch 26 also includes a shorting bar 90 which electrically connects the contacts 87 and 88 when the switch arm 85 is in engagement with the contact 89.

The contact 87 is connected by a line 91 with the switch arm 92 of switch 35 having a back contact 93 and a front contact 94. The contact 88 of switch 26 is connected by line 95 to the switch arm 96 of switch 36 having the single contact 97. Contact 89 is connected through the line 98 to the back contact 93 of the switch 35. Front contact 94 of switch 35 and contact 97 of switch 36 are connected by a line 99 to the conductor 77.

In order to energize motor 8 independently of the water level control and the valve solenoids, so that a spin operation may be provided without regard to the absence of the predetermined water level, cam 61 is formed so that it will close all three contacts 70, 71 and 72 of switch 69 during the centrifugal liquid extraction steps. When this occurs, power is supplied from conductor 67 directly through contact 72 to conductor 77 and the motors rather than through the water level control and sensing means comprising switches 25 and 26 or the valve solenoids.

A cycle of operation of the machine 1 will now be described to illustrate the manner in which the improved pressure responsive control means and circuitry of my invention effect their intended purposes. It will be assumed that the timer has been set at the beginning of the wash step so that cam 61 has caused contacts 70 and 71 to be closed, cam 62 has caused contact 76 to move to its "down" position, cam 63 has positioned switch 83 as shown, and cam 64 has closed switch 80. Also, it is assumed that the operator has poured a suitable amount of detergent into the filter pan 35 and has set the selector switch for the desired water level. Switches 35 and 36 will be in their no pressure positions as illustrated in FIGURE 2 so that no shorting circuit is completed around the solenoid valves. At this point, the first step which takes place, because of the aforementioned impedance relationship, is the introduction of water into the machine by the energization either of solenoid 23 alone to cause hot water to be provided or else, if switch 75 has been manually closed, by the energization of both solenoids to cause warm water to be provided to the machine. The energization of the solenoids causes motors 8 and 60 to remain inactive and this status continues until a shorting circuit is established by the pressure responsive control means across the solenoid valves.

Water will continue to flow into the tub until it has reached the selected level. If the selector switch 26 has been set for low water level so that switch arm 85 engages the low pressure contact 87, switch 26 is conditioned to complete a short circuiting circuit through the contact 94 of the switch 35. As the water flows into the tub, the increasing pressure on the diaphragm 31 will cause the actuator 43 or more specifically the lower arm 46 thereof to depress the switch button 37 throwing the switch arm 92 of toggle switch 35 into engagement with the contact 94. In connection with this action it is to be noted that the springs provided in the actuator 43 are sufficiently strong to prevent an overcenter or snap action of this actuator when opposed only by the biasing forces built into the toggle switch 35.

When the pressure responsive control means is set for a medium water level, water will flow into the tub until the diaphragm is depressed to a point where the knob 42 causes the actuator 44 to close the switch 36 and complete a circuit through the medium water level control 88 of the switch 26 and contact 97 of switch 36. For high water level, the selector switch is set as illustrated in FIGURE 2 of the drawing with the switch arm 85 in contact with the contact 89 and the shorting bar 90 connecting the contacts 87 and 88. The pressure of the water as it reaches its high level mark within the tub causes a further flexing of the diaphragm 31 to the point where the arm 48 of the actuator 43 passes beyond the snap action point with reference to the arm 46 with the result that the arm 46 snaps overcenter. As a result, the switch arm 35 is permitted to return to its back contact 93. In this position, a high pressure shorting circuit is completed through contact 90 of switch 26, conductor 98, contact 93 and arm 92 of switch 35, conductor 91, contacts 87 and 88 of switch 26, conductor 95, and switch arm 96 and contact 97 of switch 36 and conductor 99; the switch 36 being already positioned with the switch arm 96 in engagement with the contact 97 as the water passed the intermediate water level point.

Upon establishment of the selected shorting circuit, the solenoids are de-energized and, consequently, motors 8 and 60 are energized. The energization of motor 8 is in the direction to cause agitation operation (because of the setting of switch 83) and to provide a recirculation of water by the pump through the filter 17 and then back into the basket to introduce the detergent and filter lint during the wash cycle.

This action continues for a predetermined time until cam 64 opens switch 80. This stops the operation of motor 8 and consequently there is no further agitation although the timer motor 60 continues to operate. During the pause cam 61 closes all three contacts 70, 71 and 72 of switch 69 to connect conductor 74 to conductor 77 entirely independently of water level control circuit and so as to exclude the valve solenoids 23 and 24. Also at this time, the cam 63 reverses the position of switch 83.

The reversal of the switch 83 reverses the polarity of start winding 81 relative to main winding 79. As a result, when switch 80 is reclosed by cam 64, motor 8 is energized once again but in the opposite direction. As a result of the opposite rotation of motor 20, there is obtained a high speed spin operation to extract liquid from the clothes and a simultaneous operation of the pump 11 to cause draining of liquid out of the machine.

This spin operation continues until cam 64 again opens switch 80 to de-energize motor 8. At this time, cam 61 returns switch 69 to the same position that it had for wash, with the contact 70 disengaged from the other two contacts, and the motor connections are reversed to provide agitation rather than spin action. Also as the tub is empty, switch means 25 returns to its original no pressure settings and the cam 62 moves switch 76 to its upper position to energize cold water valve 24 and introduce cold rinse water into the machine. Upon reclosing of switch 80 by cam 64, a rinse operation starts.

Rinse agitation continues for a desired period of time, and then switch 80 is again opened. This is then followed in the same manner as before by a spin operation, after which cam 61 opens all three contacts of switch 69 to terminate the operation completely by de-energizing all components of the system.

It will be understood that, while in accordance with the patent statutes, I have described what at present is considered to be the preferred embodiment of my invention, it will be obvious to those skilled in the art that various changes and modifications may be made therein without departing from my invention.

What I claim as new and desire to secure by Letters Patent of the United States is:

1. A pressure responsive control comprising:
a single flexible diaphragm including two spaced portions movable independently of each other and positioned to be moved in response to variations in fluid pressure on said member,
a first switch having a switch arm biased to a normal position engaging a back contact and movable to a position engaging a front contact,
a second switch having a switch arm biased to an open position and movable to a closed position,
a first switch actuating means disposed between one of said portions of said movable member and said first switch for moving the wsitch arm of said first switch into engagement with said front contact in response to initial movement of said one of said portions,
a second switch actuating means disposed between the other of said portions of said movable member and said second switch for closing said second switch upon movement of said other of said portions resulting from an intermediate pressure on said movable member,
said first switch actuating means including an overcenter mechanism for permitting return of the switch arm of said first switch to engagement with said back contact upon further movement of said one of said portions under high pressure conditions on said movable member.

2. A pressure responsive control means comprising:
a flexible diaphragm positioned to be moved in response to variations in fluid pressure on said diaphragm,
first and second pressure switches,
a first switch actuating means responsive to movement of one portion of said diaphragm for operating said first switch in response to movement of said one diaphragm portion and including a relatively weak spring means opposing said movement,
a second switch actuating means responsive to movement of a second portion of said diaphragm spaced from said first portion for operating said second switch and including a relative strong spring means opposing said movement,
whereby said switches are actuated at different pressures on said diaphragm.

3. A pressure responsive control means comprising:
a flexible diaphragm including spaced first and second portions positioned to be independently moved in response to variations in fluid pressure on said diaphragm,
a first pressure switch having a switch arm normally in engagement with a back contact and movable to engage a front contact,
a second pressure switch having a switch arm movable from a normally open to a closed position,
a first actuator movable in response to movement of said first portion of said diaphragm for actuating said first switch and comprising a switch operating arm, a second arm pivotally connected to switch arm and movable by said movable member and a toggle spring between said arms for providing an overcenter movement of switch operating arm relative to said second arm,
low strength spring means biasing said first actuator to a normal pressure position in which the switch arm of said first switch engages said back contact,
whereby a low fluid pressure moves the switch arm of said first switch into engagement with said front contact, and a higher fluid pressure causes overcenter movement of said switch operating arm to permit the switch arm of said first switch to move into contact with its back contact,
a second actuator for operating said second switch in response to movement of said second portion of said diaphragm for closing said second switch, said second actuator including spring means permitting operation thereof at an intermediate pressure on said diaphragm.

References Cited by the Examiner

UNITED STATES PATENTS

| | | | |
|---|---|---|---|
| 2,656,429 | 10/53 | Tietjen | 200—81.5 |
| 2,961,286 | 11/60 | Meyers | 317—139 |
| 2,975,251 | 3/61 | Beller et al. | 200—81.5 |
| 3,024,750 | 3/62 | Winz | 317—139 |
| 3,035,189 | 5/62 | Evjen | 307—118 |

LLOYD McCOLLUM, *Primary Examiner.*